US011668386B2

(12) United States Patent
Shimamura et al.

(10) Patent No.: US 11,668,386 B2
(45) Date of Patent: Jun. 6, 2023

(54) PULLEY STRUCTURE

(71) Applicant: Mitsuboshi Belting Ltd., Kobe (JP)

(72) Inventors: Hayato Shimamura, Hyogo (JP); Katsuya Imai, Hyogo (JP); Ryosuke Dan, Hyogo (JP); Takashi Morimoto, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 791 days.

(21) Appl. No.: 16/603,304

(22) PCT Filed: Apr. 17, 2018

(86) PCT No.: PCT/JP2018/015921
§ 371 (c)(1),
(2) Date: Oct. 7, 2019

(87) PCT Pub. No.: WO2018/194075
PCT Pub. Date: Oct. 25, 2018

(65) Prior Publication Data
US 2021/0102614 A1 Apr. 8, 2021

(30) Foreign Application Priority Data

Apr. 19, 2017 (JP) .............................. JP2017-082495
Apr. 2, 2018 (JP) .............................. JP2018-070956

(51) Int. Cl.
*F16H 55/36* (2006.01)
*F02B 67/06* (2006.01)
(Continued)

(52) U.S. Cl.
CPC ............. *F16H 55/36* (2013.01); *F02B 67/06* (2013.01); *F16D 7/022* (2013.01); *F16D 13/08* (2013.01);
(Continued)

(58) Field of Classification Search
CPC ........ F02B 67/06; F02B 63/042; F16D 7/022; F16D 13/08; F16D 13/12; F16D 13/14;
(Continued)

(56) References Cited

U.S. PATENT DOCUMENTS

RE42,990 E 12/2011 Tanaka
8,678,157 B2 3/2014 Ward et al.
(Continued)

FOREIGN PATENT DOCUMENTS

CN 101981351 A 2/2011
EP 2235399 A2 10/2010
(Continued)

OTHER PUBLICATIONS

Dec. 23, 2021—(IN) Hearing Notice—App 201917039802, Eng Tran.
(Continued)

*Primary Examiner* — Thomas W Irvin
(74) *Attorney, Agent, or Firm* — Banner & Witcoff, Ltd.

(57) ABSTRACT

A pulley structure may be equipped with an outer rotating body, an inner rotating body, and a coil spring provided between the outer rotating body and the inner rotating body. The coil spring is configured so as to undergo torsional deformation in a diameter-expanding or a diameter-contracting direction, thereby engaging the outer rotating body and the inner rotating body and transmitting torque, and to undergo torsional deformation in the direction opposite the direction in which torque is transmitted, thereby entering a disengaged state in which the coil spring slides with the outer rotating body or the inner rotating body, thus interrupting the transmission of torque. The number of windings of the coil spring is in a range between [M-0.125] and M (both inclusive), where M is a natural number.

3 Claims, 8 Drawing Sheets (51) Int. Cl.
*F16D 41/20* (2006.01)
*F16D 7/02* (2006.01)
*F16D 13/08* (2006.01)
*F16D 13/12* (2006.01)
*F16D 13/14* (2006.01)
*F02B 63/04* (2006.01)
*F16F 1/06* (2006.01)
*F16F 15/121* (2006.01)

(52) U.S. Cl.
CPC ............ *F16D 13/12* (2013.01); *F16D 13/14* (2013.01); *F16D 41/206* (2013.01); *F02B 63/042* (2013.01); *F16F 1/06* (2013.01); *F16F 15/1216* (2013.01); *F16F 2228/001* (2013.01); *F16F 2232/02* (2013.01); *F16F 2234/02* (2013.01); *F16F 2236/085* (2013.01); *F16F 2238/024* (2013.01); *F16H 2055/366* (2013.01)

(58) Field of Classification Search
CPC ....... F16D 41/206; F16F 1/06; F16F 15/1216; F16F 2228/001; F16F 2232/02; F16F 2234/02; F16F 2236/085; F16F 2238/024; F16H 55/36; F16H 2055/366
See application file for complete search history.

(56) References Cited

U.S. PATENT DOCUMENTS

| | | | | |
|---|---|---|---|---|
| 8,888,622 B2* | 11/2014 | Chen | ............ | F16D 3/72 474/94 |
| 9,206,892 B2* | 12/2015 | Serkh | ............ | F16D 41/04 |
| 9,611,903 B2* | 4/2017 | Shimamura | ............ | F16F 15/129 |
| 9,797,469 B1* | 10/2017 | Serkh | ............ | F16H 7/0827 |
| 10,415,685 B2* | 9/2019 | Imai | ............ | F16D 41/206 |
| 11,274,739 B2* | 3/2022 | Shimamura | ............ | F02B 67/06 |
| 11,353,058 B2* | 6/2022 | Morimoto | ............ | F16C 33/046 |
| 2002/0104730 A1 | 8/2002 | Terada | | |
| 2007/0123380 A1 | 5/2007 | Ishida et al. | | |
| 2009/0197719 A1* | 8/2009 | Ali | ............ | F16D 7/022 474/94 |
| 2011/0015018 A1 | 1/2011 | Yamatani et al. | | |
| 2012/0298474 A1 | 11/2012 | Ward et al. | | |
| 2015/0184703 A1* | 7/2015 | Shimamura | ............ | F16F 15/1216 192/41 S |
| 2015/0285366 A1* | 10/2015 | Serkh | ............ | F16D 41/203 474/94 |
| 2016/0016225 A1* | 1/2016 | Serkh | ............ | B21F 35/02 29/896.9 |
| 2019/0136957 A1* | 5/2019 | Shimamura | ............ | F16H 55/36 |
| 2021/0180648 A1* | 6/2021 | Morimoto | ............ | F16C 33/046 |

FOREIGN PATENT DOCUMENTS

| | | |
|---|---|---|
| EP | 2865925 A1 | 4/2015 |
| JP | 2002-227973 A | 8/2002 |
| JP | 2008-057763 A | 3/2008 |
| JP | 2008-082508 A | 4/2008 |
| JP | 2014-114947 A | 6/2014 |
| WO | 2009099505 A2 | 8/2009 |

OTHER PUBLICATIONS

Jun. 19, 2018—International Search Report—Intl App PCT/JP2018/015921.
Dec. 1, 2020—(EP) Extended Search Report—App 18787141.3.
Nov. 3, 2020—(CA) Office Action—App 3,055,911.
Feb. 18, 2022—(CN) Notification of First Office Action—App 201880024267.0, Eng Tran.
Sep. 16, 2020—(IN) Examination Report—App 201917039802, Eng Tran.
Jun. 2, 2020—(JP) Decision of Refusal—App 2018-070956, Eng Tran.
Jul. 1, 2022—(CN) Notification of the Second Office Action—CN App 201880024267.0, Eng Tran.
Mar. 17, 2020—(JP) Notification of Reasons for Refusal—App 2018-070956, Eng Tran.
Jun. 24, 2021—(ID) Substantive Examination Report—App P00201908782, Eng Tran.
Sep. 7, 2022—(BR) Office Action—App. BR1120190218270, Eng Tran.
Jan. 26, 2023—(ID) Substantive Examination Report—ID App P00201908782, Eng Tran.

* cited by examiner

[FIG. 1]

Front　Rear

Front  Rear

Winding Number of Coil Spring (Angle variation [°] with respect to Example 1)

PULLEY STRUCTURE

CROSS REFERENCE TO RELATED APPLICATIONS

This is a U.S. National Phase Application under 35 U.S.C. § 371 of International Application No. PCT/JP2018/015921, filed Apr. 17, 2018, which claims priority to Japanese Application Nos. 2017-082495, filed Apr. 19, 2017 and 2018-070956, filed Apr. 2, 2018, which was published Under PCT Article 21(2), the entire contents of which are incorporated herein by reference.

TECHNICAL FIELD

The present invention relates to a pulley structure with a coil spring.

BACKGROUND ART

In an accessory-driving unit which drives an accessory machine such as an alternator by the power of an engine of a vehicle or the like, a belt is wound around a pulley connected to a driving shaft of the accessory machine such as an alternator and a pulley connected to a crankshaft of the engine. And torque of the engine is transmitted to the accessory machine through the belt. A pulley structure as disclosed in, for example, PTL 1, capable of absorbing rotational fluctuation of a crankshaft is used, in particular, as a pulley connected to a driving shaft of an alternator having inertia greater than that of other accessory machines.

The pulley structure disclosed in PTL 1 includes an outer rotating body, an inner rotating body which is provided on the inside of the outer rotating body and relatively rotatable with respect to the outer rotating body, and a coil spring, and the torque is transmitted or blocked between the outer rotating body and the inner rotating body due to diameter expansion or reduction deformation of the coil spring. In order to prevent the belt wound around the outer rotating body from slipping, the coil spring of the pulley structure functions as a one-way clutch (coil spring clutch) which transmits or blocks the torque in one direction between the outer rotating body and the inner rotating body.

CITATION LIST

Patent Literature

PTL 1: JP-A 2014-114947

SUMMARY OF INVENTION

Technical Problem

In the pulley structure including a coil spring clutch as disclosed in PTL 1, the coil spring is engaged with each of the outer rotating body and the inner rotating body and transmits torque between the outer rotating body and the inner rotating body, when the inner rotating body relatively rotates with respect to the outer rotating body in a forward direction. Meanwhile, when the inner rotating body relatively rotates with respect to the outer rotating body in a reverse direction, the coil spring is in a disengaged state where the coil spring slides (slips) with respect to the outer rotating body or the inner rotating body in the circumferential direction and does not transmit torque between the outer rotating body and the inner rotating body. Due to the sliding, in particular, the part which slides on the coil spring of the outer rotating body or the inner rotating body (hereinafter referred to as "clutch engagement portion") wears. In addition, due to the sliding, the part which slides on the clutch engagement portion in the coil spring may also wear. In the case where the clutch engagement portion has worn, when the clutch is in an engaged state, since the contact pressure between the coil spring and the clutch engagement portion decreases, the transmitted torque decreases.

Therefore, in order to maintain the function of the clutch over a long period of time and thereby prolonging the life of the pulley structure, it is necessary to prevent a portion which slides on the coil spring in the clutch engagement portion when the clutch is disengaged from wearing as much as possible. In particular, it is necessary to prevent abnormal wear from occurring in the clutch engagement portion, and to thereby avoid the pulley structure reaching its life before the vehicle reaches its life. Here, the abnormal wear of the clutch engagement portion refers to occurrence of clear, concave wear continuous along the circumferential direction to a portion of the clutch engagement portion which slides on a region of one or more rounds from a spring end on one end side of the coil spring.

In the pulley structure including the coil spring clutch as disclosed in PTL 1, in order to avoid abnormal wear of the clutch engagement portion, it is necessary to stabilize a posture of the coil spring compressed in the axial direction between the outer rotating body and the inner rotating body, to prevent a moment of a force tending to incline the coil spring in one direction from acting on a portion in contact with the clutch engagement portion of the coil spring in a compressed and loaded state, and to maintain a uniform surface pressure acting on the portion which slides on the coil spring in the clutch engagement portion.

Here, in order to stabilize the posture of the coil spring, conventionally, for example, as will be described later, a surface of the rotating body in contact with an end surface of the coil spring is shaped into a spiral surface, axial end surfaces of the coil spring are shaped into surfaces perpendicular to the axial direction of the coil spring by grinding (grinded surfaces), one end portion and the other end portion of the coil spring in the axial direction are made to be in contact with the outer rotating body and the inner rotating body, respectively in the radial direction, and the like. However, even though these configurations are adopted, when the clutch is disengaged, abnormal wear occurs in the clutch engagement portion in some cases. That is, these conventional configurations are insufficient for preventing abnormal wear of the clutch engagement portion.

An object of the present invention is to provide a pulley structure capable of preventing wear of a clutch engagement portion more reliably.

Solution to Problem

A pulley structure according to a first aspect of the present invention includes: a cylindrical outer rotating body around which a belt is to be wound; an inner rotating body provided on a radial inside of the outer rotating body and relatively rotatable with respect to the outer rotating body around a common rotation axis with the outer rotating body; and a coil spring provided between the outer rotating body and the inner rotating body and compressed in an axial direction along the rotation axis, in which the coil spring is configured to be engaged with the outer rotating body and the inner rotating body due to torsional deformation in a diameter expansion or diameter reduction direction to transmit torque between the outer rotating body and the inner rotating body, and is configured to come into a disengaged state in which the coil spring slides with respect to the outer rotating body or the inner rotating body due to torsional deformation in a direction opposite to the direction when the torque is transmitted, so as to block the transmission of torque between the outer rotating body and the inner rotating body, and in which the coil spring has a number of windings of within a range of [M-0.125] or more and M or less, where M is a natural number.

According to this configuration, it is possible to stabilize a posture of the coil spring compressed in the axial direction between the outer rotating body and the inner rotating body. Further, in a compressed and loaded state, it is possible to prevent a moment of a force tending to incline the coil spring in one direction from acting on a portion in contact with the clutch engagement portion of the coil spring. Therefore, when the coil spring (clutch) is disengaged, a surface pressure acting on the portion which slides (slips) on the coil spring in the clutch engagement portion becomes uniform. As a result, compared with a case where the number of windings of the coil spring is out of the above range, it is possible to prevent abnormal wear from occurring in the portion which slides on the coil spring in the clutch engagement portion.

A pulley structure according to a second aspect of the present invention is the pulley structure according to the first aspect, in which the number of windings of the coil spring is within a range of [M-0.069] or more and M or less.

In the case where the number of windings of the coil spring is within this range, it is possible to further stabilize a posture of the coil spring compressed in the axial direction between the outer rotating body and the inner rotating body. Further, in a compressed and loaded state, it is possible to more reliably prevent a moment of a force tending to incline the coil spring in one direction from acting on a portion in contact with the clutch engagement portion of the coil spring. Therefore, when the coil spring (clutch) is disengaged, a surface pressure acting on the portion which slides on the coil spring in the clutch engagement portion becomes uniform more reliably. As a result, it is possible to more reliably prevent abnormal wear from occurring in the portion which slides on the coil spring in the clutch engagement portion.

A pulley structure according to a third aspect of the present invention is the pulley structure according to the first or the second aspect, in which the coil spring has a torsional torque of being set to be 1 N·m or more and 10 N·m or less when the coil spring is in the disengaged state.

In the case where the torsional torque of the coil spring when the coil spring (clutch) is in the disengaged state is set to zero, the clutch is disengaged without being limited to a specific travel pattern (e.g., when the engine is started), and a frequency of sliding of the clutch engagement portion and the coil spring is increased. On the other hand, in the case where the torsional torque of the coil spring when the coil spring (clutch) is in the disengaged state is set in accordance with the present aspect, the clutch is disengaged while being limited to a specific travel pattern (e.g., when the engine is started), and a frequency of sliding of the clutch engagement portion and the coil spring is reduced. As a result, it is possible to more effectively prevent wear of the portion which slides on the coil spring in the clutch engagement portion.

Advantageous Effects of Invention

According to the present invention, it is possible to prevent abnormal wear from occurring in the portion which slides on a coil spring in a clutch engagement portion.

DESCRIPTION OF EMBODIMENTS

Hereinafter, preferred embodiments of the present invention will be described.

The pulley structure 1 of the present embodiment is, for example, installed on a driving shaft of an alternator in an accessory-driving system (not illustrated) of a vehicle. In addition, the pulley structure of the present invention may be installed on a driving shaft of an accessory machine other than the alternator.

Figure 1:
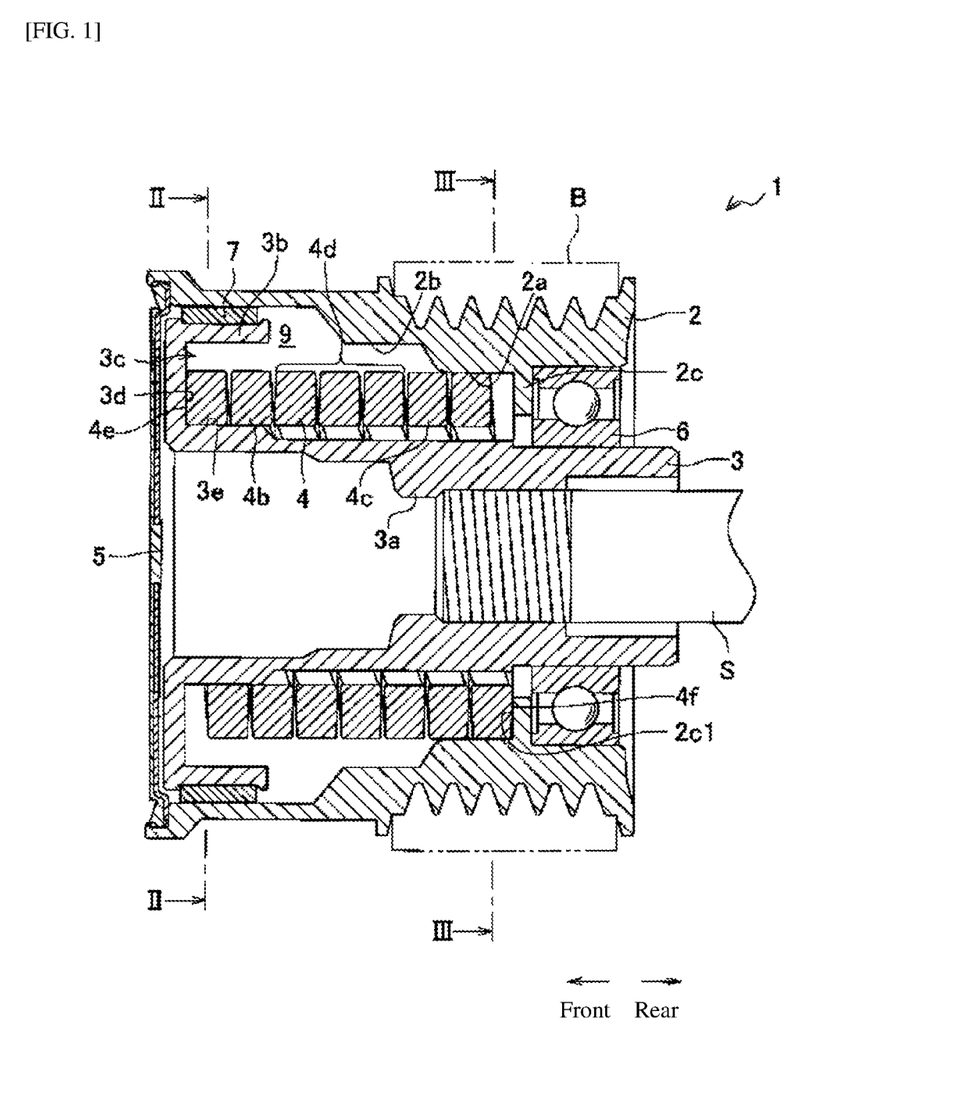
FIG. 1 is a cross-sectional view of a pulley structure according to an embodiment of the present invention.
Figure 2:
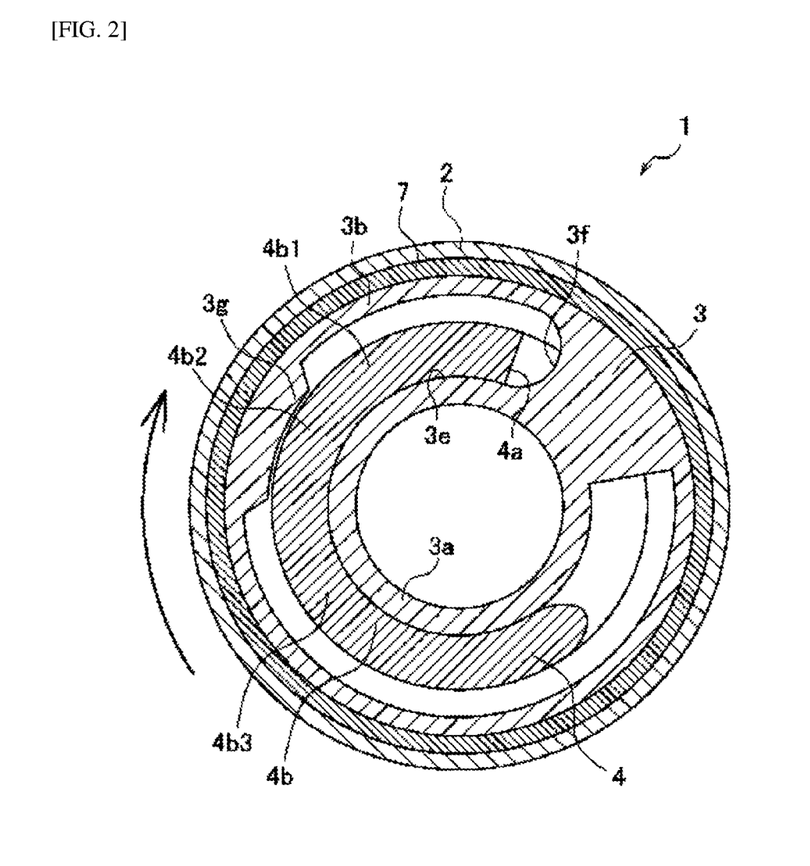
FIG. 2 is a cross-sectional view taken along line II-II of FIG. 1.
Figure 3:
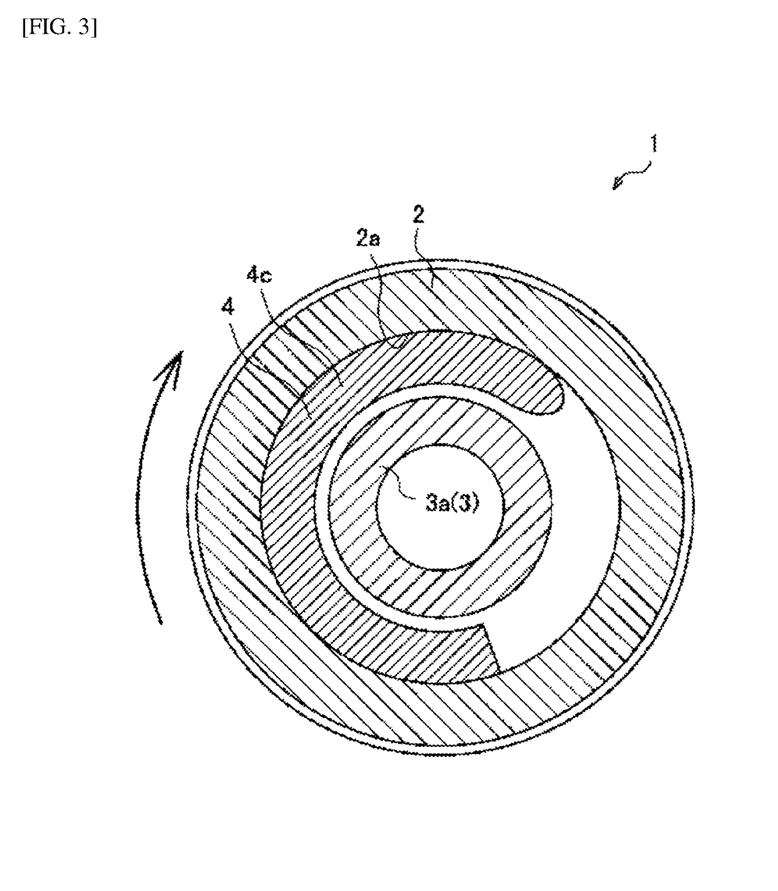
FIG. 3 is a cross-sectional view taken along line of FIG. 1.

As illustrated in FIG. 1 to FIG. 3, the pulley structure 1 includes an outer rotating body 2, an inner rotating body 3, a coil spring 4 (hereinafter, simply referred to as "spring 4" as well), and an end cap 5. Hereinafter, description will be given on the assumption that the left side in FIG. 1 is the front side and the right side is the rear side. The end cap 5 is disposed at a front end of the outer rotating body 2 and the inner rotating body 3.

Both the outer rotating body 2 and the inner rotating body 3 are substantially cylindrical and have a common rotation axis. The rotation axis of the outer rotating body 2 and the inner rotating body 3 is a rotation axis of the pulley structure 1 (hereinafter, simply referred to as "rotation axis"). In addition, the rotation axis direction is simply referred to as "axial direction". The inner rotating body 3 is provided on the inside of the outer rotating body 2 and is relatively rotatable with respect to the outer rotating body 2. A belt B is wound around an outer circumferential surface of the outer rotating body 2.

The inner rotating body 3 has a cylindrical main body 3a and an outer cylindrical portion 3b disposed on the outside of the front end of the cylindrical main body 3a. A driving shaft S of an alternator or the like is fitted to the cylindrical main body 3a. A support groove portion 3c is formed between the outer cylindrical portion 3b and the cylindrical main body 3a. The inner circumferential surface of the outer cylindrical portion 3b and the outer circumferential surface of the cylindrical main body 3a are connected to each other via a groove bottom surface 3d of the support groove portion 3c.

A rolling bearing 6 is interposed between the inner circumferential surface on the rear end of the outer rotating body 2 and the outer circumferential surface of the cylindrical main body 3a. A sliding bearing 7 is interposed between the inner circumferential surface on the front end of the outer rotating body 2 and the outer circumferential surface of the outer cylindrical portion 3b. The outer rotating body 2 and the inner rotating body 3 are connected to each other so as to be relatively rotatable by the bearings 6 and 7.

A space 9 is formed between the outer rotating body 2 and the inner rotating body 3 and in front of the rolling bearing 6. The spring 4 is accommodated in the space 9. The space 9 is formed between the inner circumferential surface of the outer rotating body 2 and the inner circumferential surface of the outer cylindrical portion 3b and the outer circumferential surface of the cylindrical main body 3a. A protruding portion 2c protruding radially inward is provided on a portion located between the rolling bearing 6 and the space 9 in the outer rotating body 2.

The inner diameter of the outer rotating body 2 decreases rearward by two stages. The inner circumferential surface of the outer rotating body 2 at the smallest inner diameter part is referred to as a pressure contact surface 2a, and the inner circumferential surface of the outer rotating body 2 at the second smallest inner diameter part is referred to as an annular surface 2b. The inner diameter of the outer rotating body 2 at the pressure contact surface 2a is smaller than the inner diameter of the outer cylindrical portion 3b. The inner diameter of the outer rotating body 2 at the annular surface 2b is the same as or greater than the inner diameter of the outer cylindrical portion 3b.

The outer diameter of the cylindrical main body 3a becomes large at the front end. The outer circumferential surface of the inner rotating body 3 at this part is referred to as a contact surface 3e.

Figure 4:
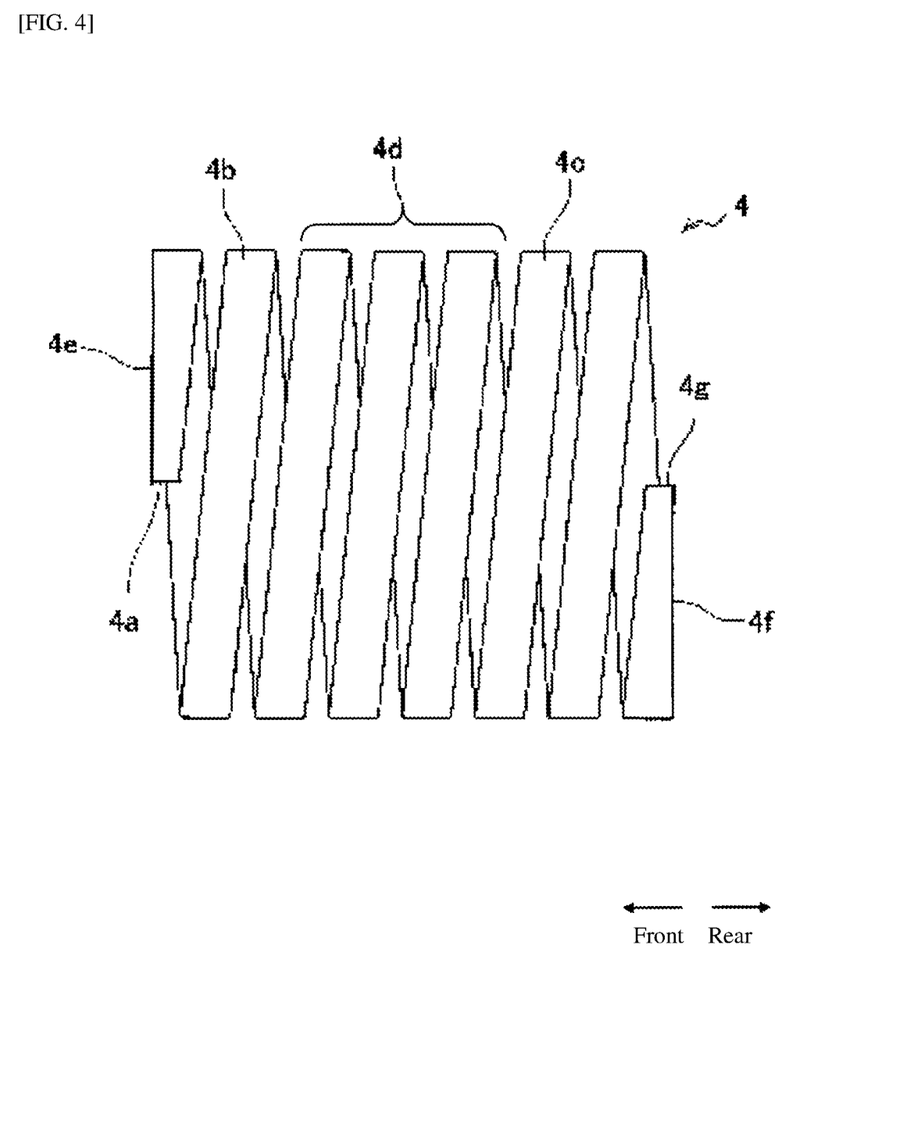
FIG. 4 is a side view of a coil spring.

As illustrated in FIG. 4, the spring 4 is a torsion coil spring formed by spirally winding (coiling) a spring wire (spring wire material). The spring 4 is wound leftward (counterclockwise from a front end 4a toward a rear end 4g). The number of windings of the spring 4 is within a range of [M−0.125] or more and M or less, where M is a natural number (e.g., about 5 to 9), and more preferably within a range of [M−0.069] or more and M or less. Here, the number of windings of the spring 4 refers to a number of times of an angle at which the spring wire is wound to 360°. In the case where the number of windings of the spring 4 is a natural number M, the angle at which the spring wire is wound is M times of 360°, and the number of overlapping spring wires is the natural number M without depending on a circumferential position of the spring 4. On the other hand, in the case where the number of windings of the spring 4 is slightly smaller or larger than a natural number, in most parts of the spring 4, the number K of overlapping spring wires is the natural number M, while in a part of the spring 4, the number K of overlapping spring wires is [M−1], which is smaller than the natural number M by one, or is [M+1], which is larger than the natural number M by one.

In a state where no external force is applied, the spring 4 has a constant diameter over the entire length. The outer diameter of the spring 4 in the state where no external force is applied is greater than the inner diameter of the outer rotating body 2 at the pressure contact surface 2a. The spring 4 is accommodated in the space 9 in a state where the diameter of a rear end side region 4c is reduced. The outer circumferential surface of the rear end side region 4c of the spring 4 is pressed against the pressure contact surface 2a by the self-elastic restoration force of the spring 4 in the diameter expansion direction. The rear end side region 4c is a region which is one round or more (360° or more around the rotation axis) from the rear end 4g of the spring 4. For example, in the case where the number of windings of the spring 4 is 7 (M=7), the rear end side region 4c is a region whose upper limit is about two rounds from the rear end 4g of the spring 4.

In addition, in a state where the pulley structure 1 is at rest and the outer circumferential surface of the rear end side region 4c of the spring 4 is pressed against the pressure contact surface 2a by the self-elastic restoration force of the spring 4 in the diameter expansion direction, a front end side region 4b of the spring 4 is in contact with the contact surface 3e in a state where the diameter thereof slightly expands. In other words, in the state where the pulley structure 1 is at rest, the inner circumferential surface of the front end side region 4b of the spring 4 is pressed against the contact surface 3e. The front end side region 4b is a region which is one round or more (360° or more around the rotation axis) from the front end 4a of the spring 4. For example, in the case where the number of windings of the spring 4 is 7 (M=7), the front end side region 4b is a region whose upper limit is about two rounds from the front end 4a of the spring 4. In the state where no external force is applied to the pulley structure 1, the spring 4 has a substantially constant diameter over the entire length.

As described above, since the outer peripheral surface of the rear end side region 4c of the spring 4 is pressed against the pressure contact surface 2a, and the inner peripheral surface of the front end side region 4b of the spring 4 is pressed against the contact surface 3e, a posture of the spring 4 in a state of being compressed in the axial direction can be stabilized.

In the state where no external force acts on the pulley structure 1 (i.e., in the state where the pulley structure 1 is at rest), the spring 4 is compressed in the axial direction, a part in the circumferential direction (a range of a half round or more and less than one round from the front end 4a) of the axial direction end surface of the front end side region 4b of the spring 4 (hereinafter referred to as "front end surface 4e") comes into contact with the groove bottom surface 3d of the inner rotating body 3, and a part in the circumferential direction (a range of about ¼ round from the rear end 4g) of the axial direction end surface of the rear end side region 4c of the spring 4 (hereinafter referred to as "rear end surface 4f") comes into contact with a front surface 2c1 of the protruding portion 2c of the outer rotating body 2. A compression ratio of the spring 4 in the axial direction is approximately 20% for example. Here, the compression ratio of the spring 4 in the axial direction is a ratio of a difference between a natural length of the spring 4 and the axial direction length of the spring 4 in the state where no external force acts on the pulley structure 1 to the natural length of the spring 4.

Grinded surfaces are formed on the front end surface 4e and the rear end surface 4f of the spring 4. The grinded surfaces are flat surfaces perpendicular to the axial direction of the spring 4, which are formed by a grinding processing. The grinded surfaces of the front end surface 4e and the rear end surface 4f are respectively formed in a range of about ¼ rounds (90°) in the circumferential direction from the ends 4a and 4g of the spring 4. In the case where the grinded surfaces are formed on the front end surface 4e and the rear end surface 4f of the spring 4 as described above, the posture of the spring 4 compressed in the axial direction can be stabilized.

The groove bottom surface 3d is formed in a spiral shape so as to be capable of coming into contact with the front end surface 4e of the spring 4. Although the groove bottom surface 3d of the support groove portion 3c and the front end surface 4e of the spring 4 are apparently in contact with each other over the entire region in the circumferential direction, there is a case in practice where a gap is formed at a part in the circumferential direction due to a processing tolerance of parts. The gap has a dimension (nominal dimension) taking into consideration the processing tolerance of the parts (e.g., a target value of the axial direction gap is 0.35 mm) with the aim that the gap becomes zero depending on the combination of finished actual size within the part tolerance. By bringing the gap as close as possible to zero, the spring 4 can stably undergo a torsional deformation. Then, by forming the groove bottom surface 3d into a spiral surface, the posture of the spring 4 compressed in the axial direction between the outer rotating body 2 and the inner rotating body 3 can be stabilized. Further, by forming the groove bottom surface 3d into a spiral surface, it is possible to prevent a center axis of the spring 4 from being eccentric or inclined with respect to the rotation axis of both of the rotating bodies due to external factors such as vibration, thereby preventing the posture of the spring 4 from becoming unstable.

On the other hand, the front surface 2c1 of the protrusion 2c slides on the rear end surface 4f of the spring 4 as will be described later, and thus is flat surface rather than a spiral surface.

As illustrated in FIG. 2, in the front end side region 4b, the vicinity of a position apart from the front end 4a of the spring 4 by 90° around the rotation axis is referred to as a second region 4b2, a part further on the front end 4a side from the second region 4b2 is referred to as a first region 4b1, and the remaining part is referred to as a third region 4b3. In addition, a region between the front end side region 4b and the rear end side region 4c of the spring 4, that is, a region which is not in contact with either the pressure contact surface 2a or the contact surface 3e is defined as a free part 4d.

As illustrated in FIG. 2, at the front end part of the inner rotating body 3, an abutting surface 3f which faces the front end 4a of the spring 4 in the circumferential direction of the inner rotating body 3 is formed. In addition, the inner circumferential surface of the outer cylindrical portion 3b is provided with a projection 3g which protrudes radially inward on the outer cylindrical portion 3b and faces the outer circumferential surface of the front end side region 4b. The projection 3g faces the second region 4b2.

Next, the behavior of the pulley structure 1 will be described.

First, the case where the rotational speed of the outer rotating body 2 becomes higher than the rotational speed of the inner rotating body 3 (i.e., the case where the outer rotating body 2 accelerates) will be described.

In this case, the outer rotating body 2 relatively rotates with respect to the inner rotating body 3 in the forward direction (direction of arrows in FIG. 2 and FIG. 3). With the relative rotation of the outer rotating body 2, the rear end side region 4c of the spring 4 moves together with the pressure contact surface 2a and rotates relative to the inner rotating body 3. Accordingly, the spring 4 undergoes a torsional deformation in the diameter expansion direction (hereinafter referred to as "diameter expansion deformation"). The pressure contact force of the rear end side region 4c of the spring 4 against the pressure contact surface 2a increases as the torsional angle of the spring 4 in the diameter expansion direction increases. The second region 4b2 is most likely to receive the torsional stress, and is separated from the contact surface 3e when the torsional angle of the spring 4 in the diameter expansion direction increases. At this time, the first region 4b1 and the third region 4b3 are in pressure contact with the contact surface 3e. The outer circumferential surface of the second region 4b2 abuts against the projection 3g at substantially the same time when the second region 4b2 becomes separated from the contact surface 3e or at the time when the torsional angle of the spring 4 in the diameter expansion direction further increases. As the outer circumferential surface of the second region 4b2 abuts against the projection 3g, the diameter expansion deformation of the front end side region 4b is restricted, the torsional stress is dispersed to parts other than the front end side region 4b of the spring 4, and in particular, the torsional stress acting on the rear end side region 4c of the spring 4 increases. Accordingly, since the difference in torsional stress acting on each part of the spring 4 is reduced and the strain energy can be absorbed by the entire spring 4, it is possible to prevent the local fatigue fracture of the spring 4.

Furthermore, the pressure contact force of the third region 4b3 against the contact surface 3e decreases as the torsional angle of the spring 4 in the diameter expansion direction increases. The pressure contact force of the third region 4b3 against the contact surface 3e becomes substantially zero at substantially the same time when the second region 4b2 abuts against the projection 3g or at the time when the torsional angle of the spring 4 in the diameter expansion direction further increases. The torsional angle of the spring 4 in the diameter expansion direction at this time is denoted by θ1 (e.g., θ1=3°). When the torsional angle of the spring 4 in the diameter expansion direction exceeds θ1, the third region 4b3 becomes separated from the contact surface 3e due to the diameter expansion deformation. However, in the vicinity of the boundary between the third region 4b3 and the second region 4b2, the spring 4 is not curved (bent), and the front end side region 4b is maintained in an arc shape. In other words, the front end side region 4b is maintained in a shape that is easy to slide with respect to the projection 3g. Therefore, when the torsional angle of the spring 4 in the diameter expansion direction increases and the torsional stress acting on the front end side region 4b increases, the front end side region 4b slides in the circumferential direction of the outer rotating body 2 with respect to the projection 3g and the contact surface 3e against the pressure contact force of the second region 4b2 against the projection 3g and the pressure contact force of the first region 4b1 against the contact surface 3e. In addition, as the front end 4a of the spring 4 presses the abutting surface 3f, torque can be reliably transmitted between the outer rotating body 2 and the inner rotating body 3.

In addition, in the case where the torsional angle of the spring 4 in the diameter expansion direction is θ1 or more and less than θ2 (e.g., θ2=45°), the third region 4b3 is separated from the contact surface 3e and is not in contact with the inner circumferential surface of the outer cylindrical portion 3b, and the second region 4b2 is in pressure contact with the projection 3g. Therefore, in this case, compared to the case where the torsional angle of the spring 4 in the diameter expansion direction is less than θ1, the effective number of windings of the spring 4 is large and thus, the spring constant (inclination of the straight line shown in FIG. 4) is small. In addition, when the torsional angle of the spring 4 in the diameter expansion direction becomes θ2, as the outer circumferential surface of the free part 4d of the spring 4 abuts against the annular surface 2b, further diameter expansion deformation of the spring 4 is restricted, to trigger a lock mechanism in which the outer rotating body 2 and the inner rotating body 3 rotate integrally. Accordingly, breakage of the spring 4 due to the diameter expansion deformation can be prevented.

Next, the case where the rotational speed of the outer rotating body 2 becomes lower than the rotational speed of the inner rotating body 3 (i.e., the case where the outer rotating body 2 decelerates) will be described.

In this case, the outer rotating body 2 relatively rotates with respect to the inner rotating body 3 in the reverse direction (a direction opposite to the direction of arrows in FIG. 2 and FIG. 3). With the relative rotation of the outer rotating body 2, the rear end side region 4c of the spring 4 moves together with the pressure contact surface 2a and rotates relative to the inner rotating body 3. Accordingly, the spring 4 undergoes a torsional deformation in the diameter reduction direction (hereinafter referred to as "diameter reduction deformation"). In the case where the torsional angle of the spring 4 in the diameter reduction direction is less than θ3 (e.g., θ3=10°), the pressure contact force of the rear end side region 4c against the pressure contact surface 2a slightly decreases compared to the case where the torsional angle is zero, but the rear end side region 4c is in pressure contact with the pressure contact surface 2a. In addition, the pressure contact force of the front end side region 4b against the contact surface 3e slightly increases compared to the case where the torsional angle is zero. In the case where the torsional angle of the spring 4 in the diameter reduction direction is θ3 or greater, the pressure contact force of the rear end side region 4c against the pressure contact surface 2a becomes substantially zero, and the rear end side region 4c slides on the pressure contact surface 2a in the circumferential direction of the outer rotating body 2. Therefore, torque is not transmitted between the outer rotating body 2 and the inner rotating body 3 (refer to FIG. 5).

Figure 5:
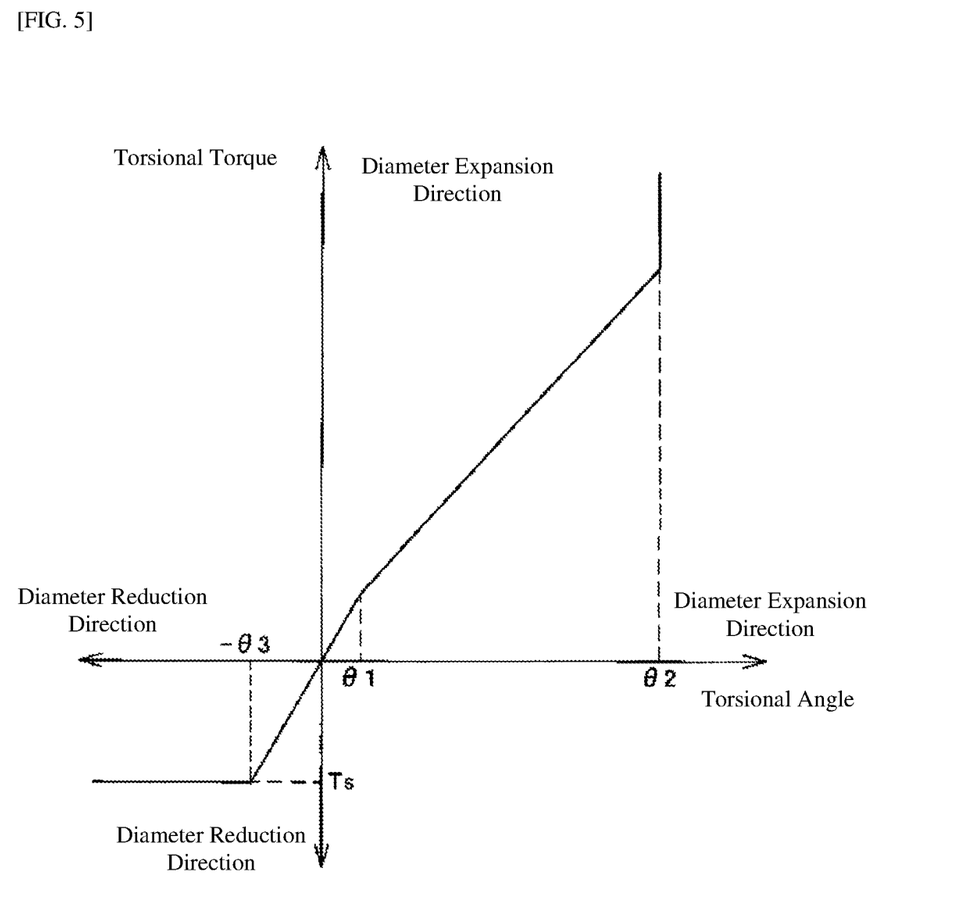
FIG. 5 is a graph showing a relationship between torsional angle and torsional torque of a coil spring of the pulley structure illustrated in FIG. 1.

Here, as shown in FIG. 5, a torsional torque of the spring 4 when the spring 4 undergoes torsional deformation in the diameter reduction direction to bring the clutch (spring 4) into the disengaged state (sliding state) (hereinafter referred to as "slip torque Ts") is preferably set to a torque that causes the spring 4 to generate slight diameter reduction deformation (diameter reduction deformation with a torsion angle of θ3 or more), rather than set to zero. Specifically, the slip torque Ts is preferably set to 1 N·m or more and 10 N·m or less (e.g., about 3 N·m).

Due to such torque characteristic, the clutch is disengaged while being limited to a specific travel pattern in which the rotational speed of the outer rotating body 2 is smaller than the rotational speed of the inner rotating body 3. For example, when the engine is started, the travel pattern is that the rotational speed of the outer rotating body 2 temporarily increases and then decreases. Then, when the rotational speed of the outer rotating body 2 increases greatly, a torque is transmitted from the outer rotating body 2 to the inner rotating body 3 to increase the rotational speed of the inner rotating body 3. Thereafter, when the rotational speed of the outer rotating body 2 decreases, the rotational speed of the outer rotating body 2 becomes lower than that of the inner rotating body 3, and at this time, the clutch is disengaged.

Here, unlike the case described above, it is assumed that the slip torque Ts is set to zero. In this case, the clutch is disengaged without being limited to a specific travel pattern (e.g., when the engine is started). Therefore, the frequency of sliding (slipping) between the pressure contact surface 2a (the clutch engagement portion) and the spring 4 increases. On the other hand, as described above, in the case where the slip torque Ts is set to be limited to a specific travel pattern, the frequency of sliding between the pressure contact surface 2a and the spring 4 decreases, and wear of the portion that slides on the spring 4 in the pressure contact surface 2a can be prevented.

In the case where the slip torque Ts is less than 1 N·m, the clutch is disengaged without being limited to a specific travel pattern (e.g., when the engine is started). In the case where the slip torque Ts exceeds 10 N·m, the clutch may not be disengaged at the time when the engine is started. When the clutch is not disengaged at the time when the engine is started, the belt B wound around the outer rotating body 2 cannot be prevented from slipping, and in the worst case, the belt B may be detached from the outer rotating body 2.

In the present embodiment, the slip torque Ts is set to such a torsional torque that causes a slight diameter reduction deformation of the spring 4, when the spring 4 is stored between the outer rotating body 2 and the inner rotating body 3, by optimizing design values including an amount by which the rear end side region 4c of the spring 4 is reduced (a pressure contact force to a clutch engagement surface), an amount by which the spring 4 is compressed in the axial direction (pressure contact forces to axial mating surfaces), and the like, and by adjusting the sliding resistance between the spring 4 and the outer rotating body 2.

In this manner, the spring 4 is a coil spring clutch and functions as a one-way clutch for transmitting or blocking torque in one direction. The spring 4 is engaged with each of the outer rotating body 2 and the inner rotating body 3 and transmits torque between the outer rotating body 2 and the inner rotating body 3, when the outer rotating body 2 relatively rotates with respect to the inner rotating body 3 in a forward direction. Meanwhile, when the outer rotating body 2 relatively rotates with respect to the inner rotating body 3 in a reverse direction, the spring 4 slides with respect to the pressure contact surface 2a, and does not transmit torque between the outer rotating body 2 and the inner rotating body 3.

Figure 6:
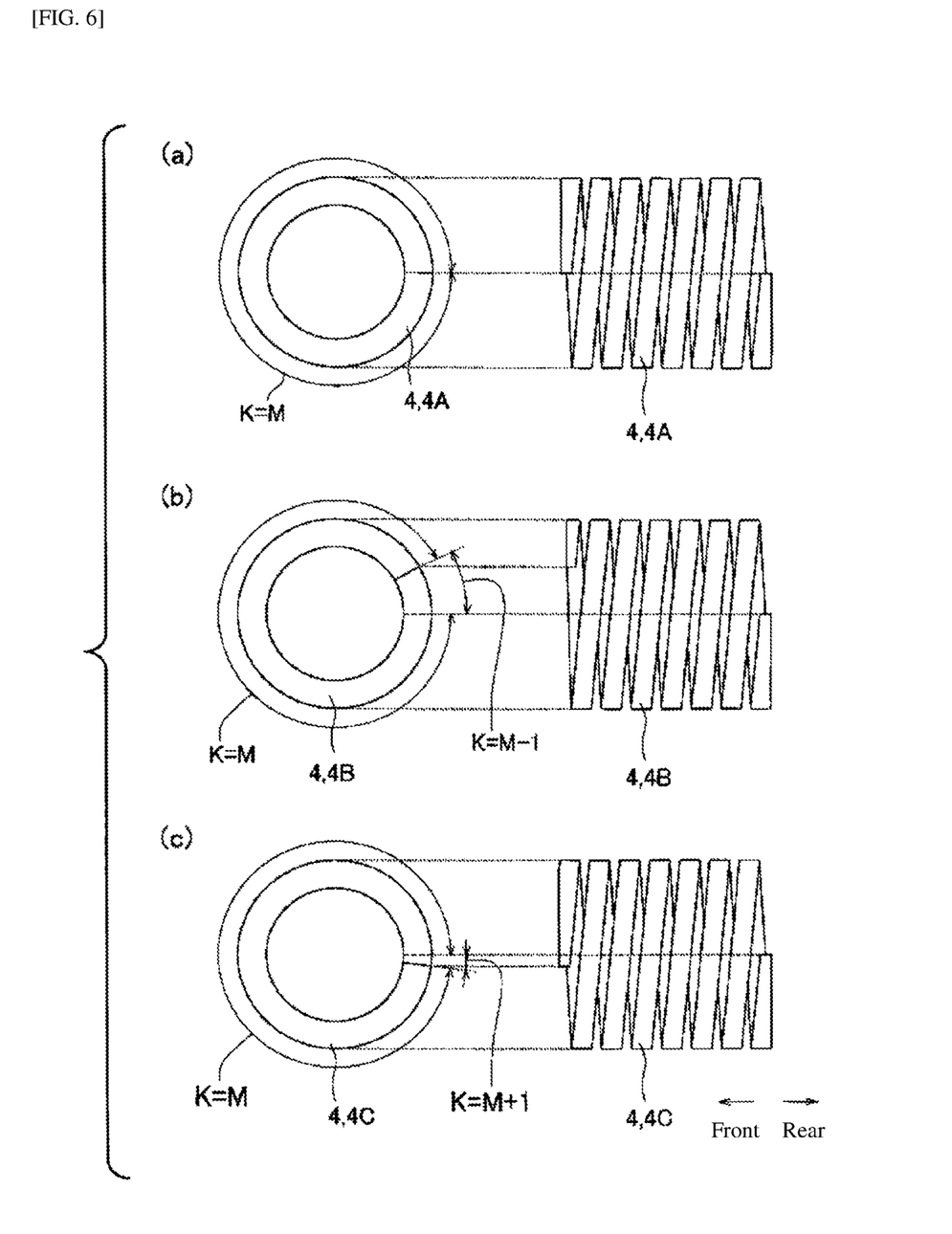
FIG. 6 is a diagram illustrating a relationship between a number of windings of the coil spring and a number of overlapping spring wires, where (a) illustrates a case where the number of windings is a natural number M, (b) illustrates a case where the number of windings is slightly smaller than the natural number M, and (c) illustrates a case where the number of windings is slightly larger than the natural number M.

Here, as the coil spring 4 constituting the pulley structure 1, it is assumed that three types of coil springs 4A to 4C having different numbers of windings as illustrated in (a) to (c) of FIG. 6 are employed. The coil spring 4A is a coil spring having a number of windings that is a natural number M (M=7 in the drawing). The coil spring 4B is a coil spring having a number of windings that is slightly smaller than the natural number M. The coil spring 4C is a coil spring having a number of windings that is slightly larger than the natural number M. In (a) to (c) of FIG. 6, the drawings on the left are views of the coil spring 4 viewed from the front, and the drawings on the right are views of the coil spring 4 viewed from a side, respectively.

In the coil spring 4A, the number K of overlapping spring wires is the same M without depending on the circumferential position of the spring 4. Therefore, compression rigidity of the coil spring 4A is uniform without depending on the circumferential position, and the posture of the coil spring 4A in the compressed and loaded state is stable.

Thereby, a moment of a force tending to incline the coil spring 4A in one direction substantially does not act on a portion in contact with the pressure contact surface 2a (the clutch engagement portion) of the coil spring 4A. As a result, the surface pressure applied from the coil spring 4A to the pressure contact surface 2a does not concentrate at a part, and there is little concern that abnormal wear occurs in the pressure contact surface 2a.

In the coil spring 4B, the number K of overlapping spring wires is [M−1] in a part in the circumferential direction, and the number K of overlapping spring wires is M in the other part. Therefore, compared with the coil spring 4A, the coil spring 4B has larger variation in the compression rigidity depending on the circumferential position. However, in the coil spring 4B as well, in the case where an area in which the number K of overlapping spring wires is small is relatively narrow (the case of 45° or less), since a portion having a large number K of overlapping spring wires is wide, and this portion functions to abut against the groove bottom surface 3d and the protruding portion 2c, the posture of the coil spring 4B in the compressed and loaded state is relatively stable. Thereby, a moment of a force tending to incline the coil spring 4B in one direction is unlikely to act on a portion in contact with the pressure contact surface 2a of the coil spring 4B. As a result, the surface pressure applied from the coil spring 4B to the pressure contact surface 2a is unlikely to concentrate at a part, and abnormal wear is unlikely to occur in the pressure contact surface 2a.

In the coil spring 4C, the number K of overlapping spring wires is [M+1] in a part in the circumferential direction, and the number K of overlapping spring wires is M in the other part. Then, in the coil spring 4C, in a compressed and loaded state, a portion having a large number K of overlapping spring wires functions to abut against the groove bottom surface 3d and the protruding portion 2c. Therefore, a moment of a force tending to incline the coil spring 4C in one direction acts on a portion in contact with the pressure contact surface 2a of the coil spring 4C. As a result, the surface pressure applied from the coil spring 4C to the pressure contact surface 2a concentrates at a part, and abnormal wear may occur in the part of the pressure contact surface 2a.

For these reasons, in the case where a coil spring 4 whose numbers of windings are a natural number M or slightly smaller than the natural number M (the coil springs 4A and 4B) is employed, as compared to the case where a coil spring 4 whose number of windings is slightly larger than the natural number M (the coil spring 4C) is employed, when the pulley structure 1 is operated, abnormal wear is unlikely to occur in the pressure contact surface 2a. Furthermore, at this time, in the case where the number of windings of the coil spring 4 is within the range of [M−0.125] or more and M or less, the abnormal wear can be prevented more reliably. Still further, at this time, in the case where the number of windings of the coil spring 4 is within the range of [M−0.069] or more and M or less, the abnormal wear can be prevented more effectively.

EXAMPLES

Next, specific examples of the present invention will be described.

Example 1

The pulley structure of Example 1 had the same configuration as that of the pulley structure 1 of the above-described embodiment, and the spring wire of the coil spring (4) was oil tempered wire for a spring (in conformity with JIS G 3560: 1994). The spring wire was a trapezoidal wire, and had an inner diameter side axial direction length of 3.8 mm, an outer diameter side axial direction length of 3.6 mm and a radial direction length of 5.0 mm. The number of windings of the coil spring (4) was 7 (M=7), and the winding direction was a leftward direction. The compression ratio of the coil spring (4) in the axial direction was set to approximately 20%. The gap between the adjacent spring wires in the axial direction was 0.3 mm. In addition, the wire inclination of the coil spring was 0.7°. In other words, the outer diameter side part (the surface on the outer diameter side) in the cross-section of the spring wire was inclined by 0.7° with respect to the outer diameter reference line parallel to the center axial line of the cross-sectional coil spring of the spring wire.

Examples 2 to 8

The pulley structures of Examples 2 to 8 had the same configuration as that of the pulley structure of Example 1 except for the number of windings of the coil spring. The coil springs (4) of Examples 2 to 8 respectively had numbers of winding that were smaller by lengths of 5°, 10°, 20°, 25°, 30°, 40°, and 45° than the coil spring of Example 1. Thereby, for example, with respect to the coil spring of Example 1, the number of windings of the coil spring (4) of Example 8, which had a number of windings smaller by a length of 45°, is 6.875 (=7−0.125), and the number of windings of the coil spring (4) of Example 5, which has a number of windings smaller by a length of 25°, is 6.931 (=7−0.069).

Comparative Examples 1, 2

The pulley structures of Comparative Examples 1, 2 had the same configuration as that of the pulley structure of Example 1 except for the coil spring. The coil spring of Comparative Example 1 had a number of winding that was larger by a length of 5° than the coil spring of Example 1. As a result, the number of windings of the coil spring of Comparative Example 1 is 7.014. The coil spring of Comparative Example 2 had a number of winding that was smaller by a length of 50° than the coil spring of Example 1. As a result, the number of windings of the coil spring of Comparative Example 2 is 6.861.

The natural length of the coil spring also increases or decreases as the number of windings of the coil spring increases or decreases. Therefore, strictly, the axial compression ratio of the coil spring in a state in which the pulley structure is at rest (design value: about 20%) is slightly different among the specimens, but does not reach a level that particularly affects the evaluation result.

[Evaluation Method]

Figure 7:
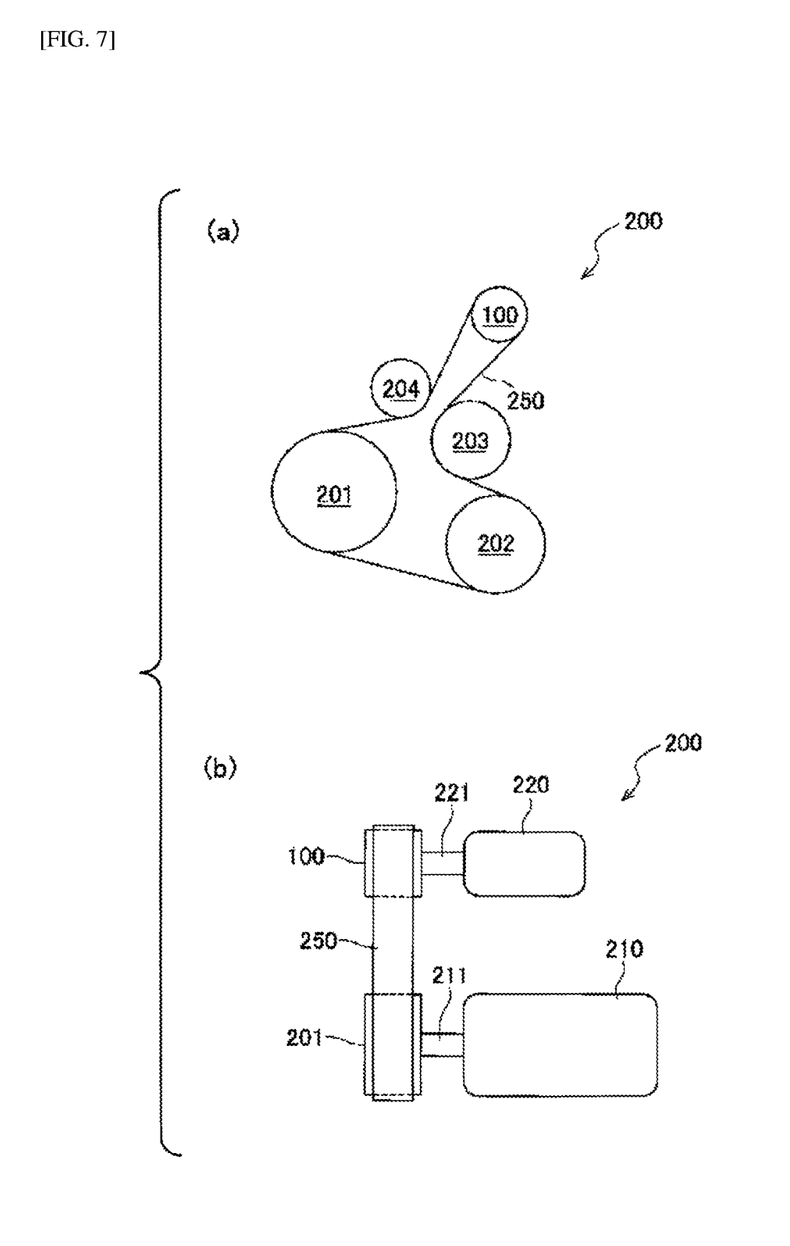
FIG. 7 is a schematic configuration view of an engine bench-testing machine used in a test in Examples, where (a) is a view viewed from an axial direction of a pulley structure, and (b) is a view viewed from a direction perpendicular to the axial direction of the pulley structure.

Regarding the pulley structures of Examples 1 to 8 and Comparative Examples 1 and 2, a wear resistance test was conducted by using an engine bench-testing machine 200 illustrated in (a) and (b) of FIG. 7. The engine bench-testing machine 200 is a test apparatus including an accessory-driving system and includes a crank pulley 201 attached to a crankshaft 211 of an engine 210, an AC pulley 202 connected to an air conditioner/compressor (AC), and a WP pulley 203 connected to a water pump (WP). The pulley structure 100 of Examples 1 to 8 and Comparative Examples 1 and 2 is connected to a shaft 221 of an alternator (ALT) 220. In addition, an auto tensioner (A/T) 204 is provided in the belt span between the crank pulley 201 and the pulley structure 100. The output of the engine is transmitted clockwise from the crank pulley 201 to each of the pulley structure 100, the WP pulley 203, and the AC pulley 202 via one belt (V-ribbed belt) 250, and each accessory machine (alternator, water pump, air conditioner/compressor) is driven. In (b) of FIG. 7, illustration of the pulleys 202, 203, and 204 is omitted, and connection between the pulley structure 100 and the crank pulley 201 via the belt 250 is illustrated.

At an ambient temperature of 90° C. and a belt tension of 1,500 N, the initiating and stopping of the engine was alternately repeated, and the test was completed when the number of times of initiating the engine reached 500,000 times that corresponds to the actual vehicle life. One operating time of the engine (time period from the initiating to the stopping) was set to 10 seconds. In addition, the ambient temperature is a temperature set by assuming a temperature in a constant temperature chamber surrounding the alternator, the pulley structure and the crank pulley in an actual vehicle. In addition, the rotational speed of the crankshaft when initiating the engine every time fluctuated between 0 and 1,800 rpm. By repeating the initiating and stopping of the engine, the coil spring is alternately engaged with and slides on the pressure contact surface (2a) (hereinafter, referred to as a "clutch engagement portion") of the outer rotating body (2).

After completion of the test, the pulley structure 100 was disassembled and the maximum wear depth of the clutch engagement portion (pressure contact surface) was measured. The results are shown in the following Table 1 and FIG. 8. The case where the maximum wear depth of the clutch engagement portion (pressure contact surface) exceeds 0.15 mm, was considered as evaluation C (failed). The case where the maximum wear depth of the clutch engagement portion (pressure contact surface) is 0.15 mm or less and more than 0.075 mm was considered as evaluation B (passed), as a level capable of withstanding a practical use without a problem. The case where the maximum wear depth of the clutch engagement portion (pressure contact surface) is 0.075 mm or less (equal to or less than a half of the pass and fail determination level of 0.15 mm) was considered as A (passed), as a level capable of withstanding a practical use with a sufficient margin without a problem.

TABLE 1

| | Number of windings of coil spring | Angle variation [°] | Maximum wear depth [mm] | Evaluation |
|---|---|---|---|---|
| Comparative Example 1 | 7.014 | +5 | 0.16 | C |
| Example 1 | 7 | ±0 | 0.051 | A |
| Example 2 | 6.986 | −5 | 0.054 | A |
| Example 3 | 6.972 | −10 | 0.057 | A |
| Example 4 | 6.944 | −20 | 0.064 | A |
| Example 5 | 6.931 | −25 | 0.074 | A |
| Example 6 | 6.917 | −30 | 0.087 | B |
| Example 7 | 6.889 | −40 | 0.12 | B |
| Example 8 | 6.875 | −45 | 0.14 | B |
| Comparative Example 2 | 6.861 | −50 | 0.17 | C |

Figure 8:
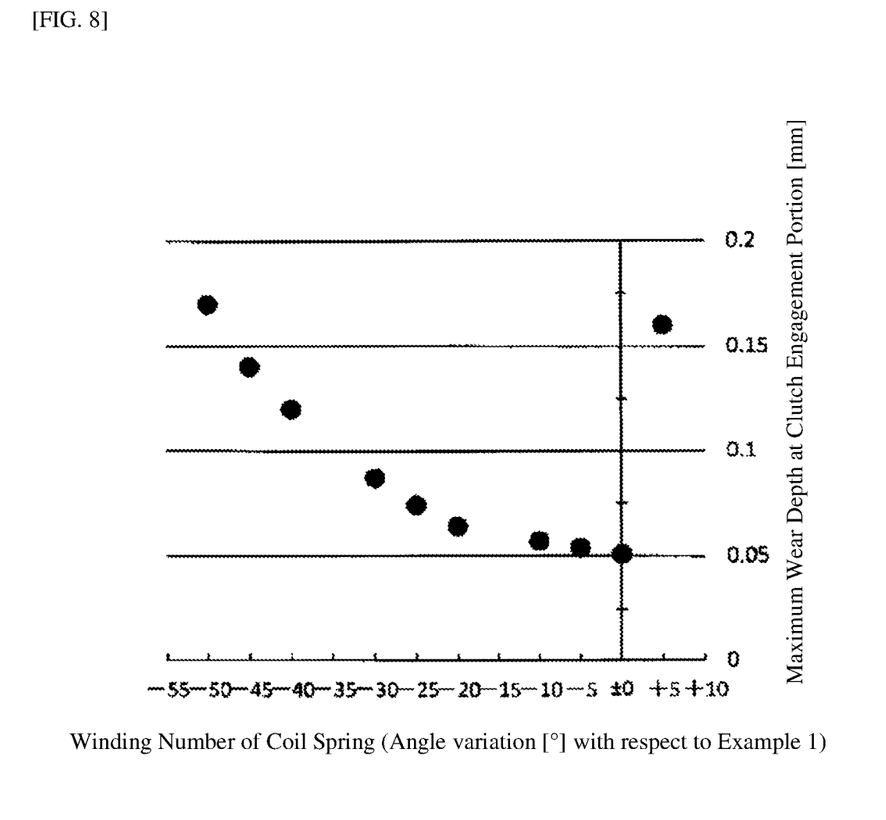
FIG. 8 is a graph showing a relationship between the number of windings of the coil spring and a maximum wear depth of a clutch engagement portion in Examples and Comparative Examples.

From the results of the wear resistance test shown in Table 1 and FIG. 8, it was found that in order to effectively prevent abnormal wear of the clutch engagement portion, the number of windings of the coil spring is preferably set in the range of [M-0.125] or more and M or less (evaluation A to B). Further, it was found that it is more preferable to set the number of windings of the coil spring to be in the range of [M-0.069] or more and M or less (Evaluation A).

As described above, the more uniform the compression rigidity of the coil spring is in the circumferential direction, the more the posture of the coil spring is stabilized in the compressed and loaded state, and the more the moment of the force tending to incline the coil spring in one direction is unlikely to act on the portion in contact with the clutch engagement portion of the coil spring in the compressed and loaded state. Therefore, when the clutch is disengaged, the surface pressure acting on the portion which slides on the coil spring in the clutch engagement portion can be maintained uniformly. As a result, when the clutch is disengaged, it is possible to prevent the surface pressure applied from the coil spring from concentrating at a part of the clutch engagement portion. The results of the wear resistance test shown in Table 1 and FIG. 8 confirm this idea.

Next, modified embodiments in which various modifications has been added to the present embodiment will be described.

In the embodiment described above, the pulley structure is configured such that the outer rotating body 2 includes the pressure contact surface 2a as the clutch engagement portion, but it is not limited thereto. The pulley structure may include a clutch engagement portion in which the inner rotating body 3 slides on the spring 4.

In the above-described embodiment, the spring 4 is configured to come into the disengaged state when torsional deformation occurs in the diameter reduction direction, but it is not limited thereto. The coil spring may be configured to come into the disengaged state by sliding on the outer rotating body or the inner rotating body when torsional deformation occurs in the diameter expansion direction.

Although the present invention has been described in detail with reference to a specific example, it is obvious to those skilled in the art that various changes and modifications may be made without departing from the gist and the scope of the invention.

This application is based on Japanese Patent Application 2017-082495 filed on Apr. 19, 2017, and Japanese Patent Application 2018-070956 filed on Apr. 2, 2018, contents of which are incorporated by reference herein.

DESCRIPTION OF REFERENCE NUMERALS

1 Pulley structure
2 Outer rotating body
2a Pressure contact surface
3 Inner rotating body
4 Coil spring

The invention claimed is:

1. A pulley structure comprising:
a cylindrical outer rotating body around which a belt is to be wound;
an inner rotating body provided on a radial inside of the outer rotating body and relatively rotatable with respect to the outer rotating body around a common rotation axis with the outer rotating body; and
a coil spring provided between the outer rotating body and the inner rotating body and compressed in an axial direction along the common rotation axis,
wherein the coil spring is configured to be engaged with the outer rotating body and the inner rotating body due to torsional deformation in a diameter expansion or diameter reduction direction to transmit torque between the outer rotating body and the inner rotating body, and is configured to come into a disengaged state in which the coil spring slides with respect to the outer rotating body or the inner rotating body due to torsional deformation in a direction opposite to the direction when the torque is transmitted, so as to block the transmission of torque between the outer rotating body and the inner rotating body, and wherein the coil spring has a number of windings within a range of M-0.669 or more and less than M, where M is a natural number.

2. The pulley structure according to claim 1, wherein the coil spring has a torsional torque, which is set to be 1 N·m or more and 10 N·m or less when the coil spring is in the disengaged state.

3. The pulley structure according to claim 1, wherein the coil spring has a torsional torque, which is set to be 1 N·m or more and 10 N·m or less when the coil spring is in the disengaged state.

* * * * *